(12) United States Patent
Yang et al.

(10) Patent No.: US 12,436,090 B2
(45) Date of Patent: Oct. 7, 2025

(54) SYSTEM AND METHOD FOR EXTRACTING OPTICAL FEATURE INFORMATION

(71) Applicant: ELECTRONICS AND TELECOMMUNICATIONS RESEARCH INSTITUTE, Daejeon (KR)

(72) Inventors: Hoe-Sung Yang, Daejeon (KR); Kang Bok Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 207 days.

(21) Appl. No.: 18/137,574

(22) Filed: Apr. 21, 2023

(65) Prior Publication Data

US 2024/0201069 A1  Jun. 20, 2024

(30) Foreign Application Priority Data

Dec. 20, 2022  (KR) .................. 10-2022-0179158

(51) Int. Cl.
| | | |
|---|---|---|
| *G01N 21/17* | (2006.01) | |
| *G01N 21/47* | (2006.01) | |
| *G01N 21/55* | (2014.01) | |
| *G01N 21/59* | (2006.01) | |

(52) U.S. Cl.
CPC .............. *G01N 21/17* (2013.01); *G01N 21/47* (2013.01); *G01N 21/55* (2013.01); *G01N 21/59* (2013.01); *G01N 2021/1736* (2013.01)

(58) Field of Classification Search
CPC ........ G01N 21/17; G01N 21/47; G01N 21/55; G01N 21/59; G01N 2021/1736; G01N 2021/558; G01N 21/474; G01N 21/49; G01N 2201/0642; G01N 21/31; G01N 21/314; G01N 21/255; G01N 21/27
See application file for complete search history.

(56) References Cited

U.S. PATENT DOCUMENTS

| | | | |
|---|---|---|---|
| 9,098,989 B2 * | 8/2015 | Fischer | ............... G08B 17/107 |
| 2013/0238138 A1 | 9/2013 | Cole et al. | |
| 2014/0169389 A1 | 6/2014 | Kim et al. | |
| 2014/0178069 A1 | 6/2014 | Kim et al. | |
| 2020/0363312 A1 | 11/2020 | Deliwala | |

FOREIGN PATENT DOCUMENTS

| | | |
|---|---|---|
| JP | 2022-187906 A | 12/2022 |
| KR | 10-1963111 B1 | 7/2019 |
| KR | 10-2103077 B1 | 4/2020 |
| KR | 10-2020-0107818 A | 9/2020 |
| KR | 10-2275994 B1 | 7/2021 |
| KR | 10-2352201 B1 | 1/2022 |

* cited by examiner

*Primary Examiner* — Tony Ko
(74) *Attorney, Agent, or Firm* — LRK PATENT LAW FIRM

(57) ABSTRACT

An optical feature information extraction system according to the present disclosure includes a light source part which generates light having a plurality of wavelengths; a photodetecting part which detects light of each wavelength by any one of scattering, transmission, and reflection of the generated light with respect to an object; an analog front end part amplifying a first measurement value from the photodetecting part; and a control part which extracts an optical feature value for the object based on the amplified first measurement value.

14 Claims, 18 Drawing Sheets

SYSTEM AND METHOD FOR EXTRACTING OPTICAL FEATURE INFORMATION

CROSS-REFERENCE TO RELATED APPLICATION(S)

This application claims priority to Korean Patent Application No. 10-2022-0179158, filed on Dec. 20, 2022, with the Korean Intellectual Property Office (KIPO), the entire content of which is hereby incorporated by reference.

BACKGROUND

1. Technical Field

The present disclosure relates to an optical feature information extraction system and method.

2. Description of Related Art

When light from a light source such as LED or laser is radiated to a substance such as gas, liquid, or solid, the light is scattered, reflected, absorbed, or transmitted for a specific wavelength according to the characteristics of the substance. When this is measured by a photodetecting device such as a photodiode or photodetector, its degree is differently represented.

These properties are widely applied not only to industrial fields such as dust detection, smoke detection, photo-plethysmography (PPB), and gas detection, but also to daily life. In such applications, the fact that the intensity of the sensing value measured by the photodetecting device varies according to the concentration of the target substance may be mainly utilized, or the concentration of a substance may be distinguished by calculating a difference or ratio of sensed values for respective wavelengths based on the relationship of wavelength between the degree of scattering, reflection, absorption and transmission of light and the substance.

However, with this calculation method, it is difficult to distinguish specific substances such as gas, liquid, and solid, or to distinguish reactive characteristics of wavelength and substance.

SUMMARY

One problem to be addressed by the present disclosure is to provide an optical feature information extraction system and method which extract feature information for classifying substances from measurement values measured by a photodetecting device with the correlation between substances, such as gases, liquids, and solids, and wavelengths.

However, the problems to be solved by the present disclosure are not limited to the foregoing, and other problems may exist.

An optical feature information extraction system according to the first aspect of the present disclosure for solving the above-described problems includes: a light source part which generates light having a plurality of wavelengths; a photodetecting part which detects light of each wavelength by any one of scattering, transmission, and reflection of the generated light with respect to an object; an analog front end part amplifying a first measurement value from the photodetecting part; and a control part which extracts an optical feature value for the object based on the amplified first measurement value.

Additionally, an optical feature information extraction system according to the second aspect of the present disclosure includes: a light source part which generates light having a plurality of wavelengths; a multiple-channel-based photodetecting part which detects light of each wavelength by two or more of scattering, transmission, and reflection of the generated light with respect to an object; an analog front end part amplifying a plurality of first measurement values corresponding to respective multiple channels in the photodetecting part; and a control part which extracts an optical feature value for the object based on the amplified plurality of first measurement values.

Additionally, a method performed by an optical feature information extraction system according to the third aspect of the present disclosure includes: generating light having a plurality of wavelengths through control of a light source part; detecting light of each wavelength by any one of scattering, transmission, and reflection of the generated light with respect to an object by controlling a photodetecting part; amplifying a first measurement value from the photodetecting part through an analog front end part; and extracting an optical feature value for the object based on the amplified first measurement value.

A computer program according to another aspect of the present disclosure for solving the above-described problems is combined with a computer, which is hardware, to execute the optical feature extraction method, and is stored in a computer-readable recording medium.

Other specific details of the disclosure are included in the detailed description and drawings.

According to an embodiment of the present disclosure described above, when a light source such as an LED or a laser is radiated to a target substance such as a gas, liquid, or solid, and reflected, scattered, or transmitted light is measured through a photodetecting device such as a photodiode or a photodetector, the effect of distinguishing the reactive characteristics of the substance can be expected by extracting the unique feature point of the substance besides the concentration characteristics of the substance.

Effects of this disclosure are not limited to the effects mentioned above, and other effects not mentioned above can be clearly appreciated by those skilled in the art from the description below.

DETAILED DESCRIPTION

Figure 1:
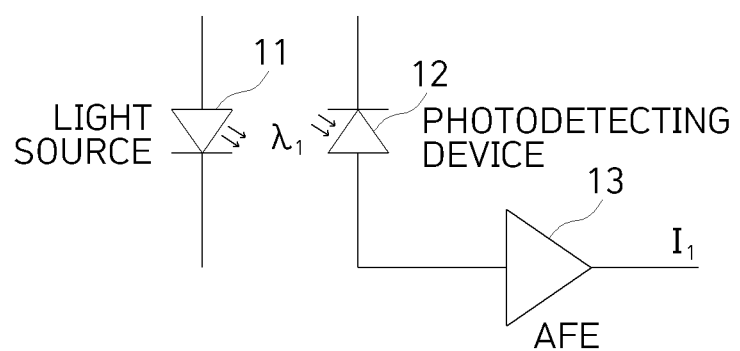
FIG. 1 is a diagram showing a single-wavelength-based configuration of a light source and a photodetecting device.

Advantages and characteristics of the disclosure, and methods of achieving them will become apparent with reference to the embodiments described below in detail in conjunction with the accompanying drawings. However, the present disclosure is not limited to the embodiments disclosed below, but will be implemented in a variety of different forms, and the present embodiments are only provided so that the present disclosure is complete, and to fully inform those of ordinary skill in the art to which the present disclosure pertains of the scope of the disclosure, and the present disclosure is only defined by the scope of the claims.

As used herein, the terms are for the purpose of describing the embodiments, and are not intended to limit the present disclosure. Herein, terms in the singular form also relate to the plural form unless specifically stated otherwise in the context. As used herein, the terms "comprises" and/or "comprising" do not preclude the presence or addition of at least one component other than the recited elements. Like reference numerals refer to like elements throughout the specification, and "and/or" includes each and every combination of one or more of the recited elements. Although "first", "second", etc. are used to describe various components, these components are not limited by such terms, of course. These terms are only used to distinguish one component from another. Accordingly, it goes without saying that the first element mentioned below may also be the second element within the technical spirit of the present disclosure.

Unless otherwise defined, all terms (including technical and scientific terms) used herein have the same meaning as commonly understood by those skilled in the art to which this disclosure pertains. In addition, terms defined in commonly used dictionaries are not to be interpreted ideally or excessively unless explicitly specifically defined.

Hereinafter, the background from which the present disclosure was conceived will be described in order to aid the understanding of those skilled in the art, and then the present disclosure will be described in detail.

FIG. 1 is a diagram showing a single-wavelength-based configuration of a light source 11 and a photodetecting device 12.

Referring to FIG. 1, the output of the photodetecting device 12 for one peak wavelength λ1 is amplified by an analog front end (AFE) 13 and measured. In this regard, the intensity of the measured wavelength is referred to as I. In addition, the measurement value for the wavelength λ1 is referred to as I1.

Meanwhile, in FIG. 1, the light source 11 may include an LED or a laser, and the photodetecting device 12 may include a photodiode or a photo detector.

Figure 2A:
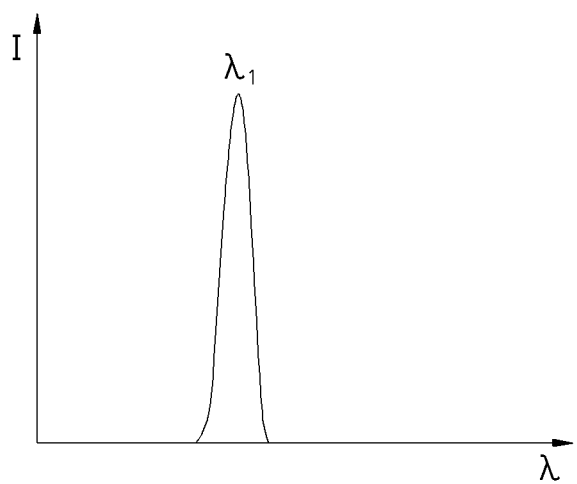
FIGS. 2A and 2B are diagrams illustrating measurement values from a single-wavelength-based configuration of a light source and a photodetecting device in a wavelength domain and a time domain.
Figure 2B:
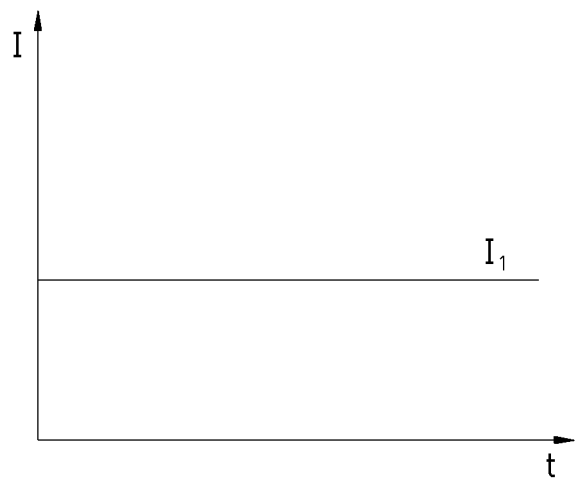

FIGS. 2A and 2B are diagrams illustrating measurement values from a single-wavelength-based configuration of a light source and a photodetecting device in a wavelength domain and a time domain.

Figure 3:
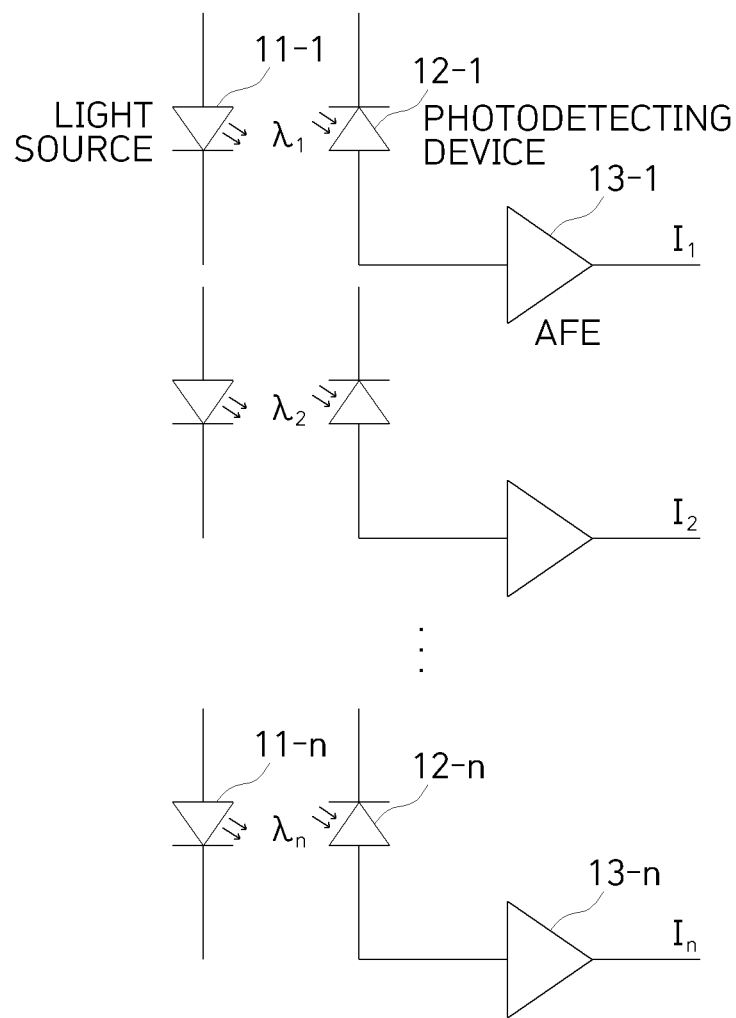
FIG. 3 shows an example in which a light source, a photodetecting device, and an AFE are configured in a one-to-one relationship for measuring a plurality of wavelengths.

FIG. 3 is a diagram showing a multiple-wavelength-based configuration of light sources 11-1 to 11-n and photodetecting devices 12-1 to 12-n.

FIG. 1 shows a configuration for one photodetecting device measurement for a single wavelength, and in order to measure a plurality of wavelengths, the plurality of light sources 11-1 to 11-n based on multiple wavelengths and the plurality of photodetecting devices 12-1 to 12-n may be configured.

FIG. 3 shows an example of one-to-one configuration of the light sources 11-1 to 11-n, the photodetecting devices 12-1 to 12-n, and AFEs 13-1 to 13-n for measuring multiple wavelengths, that is, n (n is a natural number) wavelengths.

Figure 4:
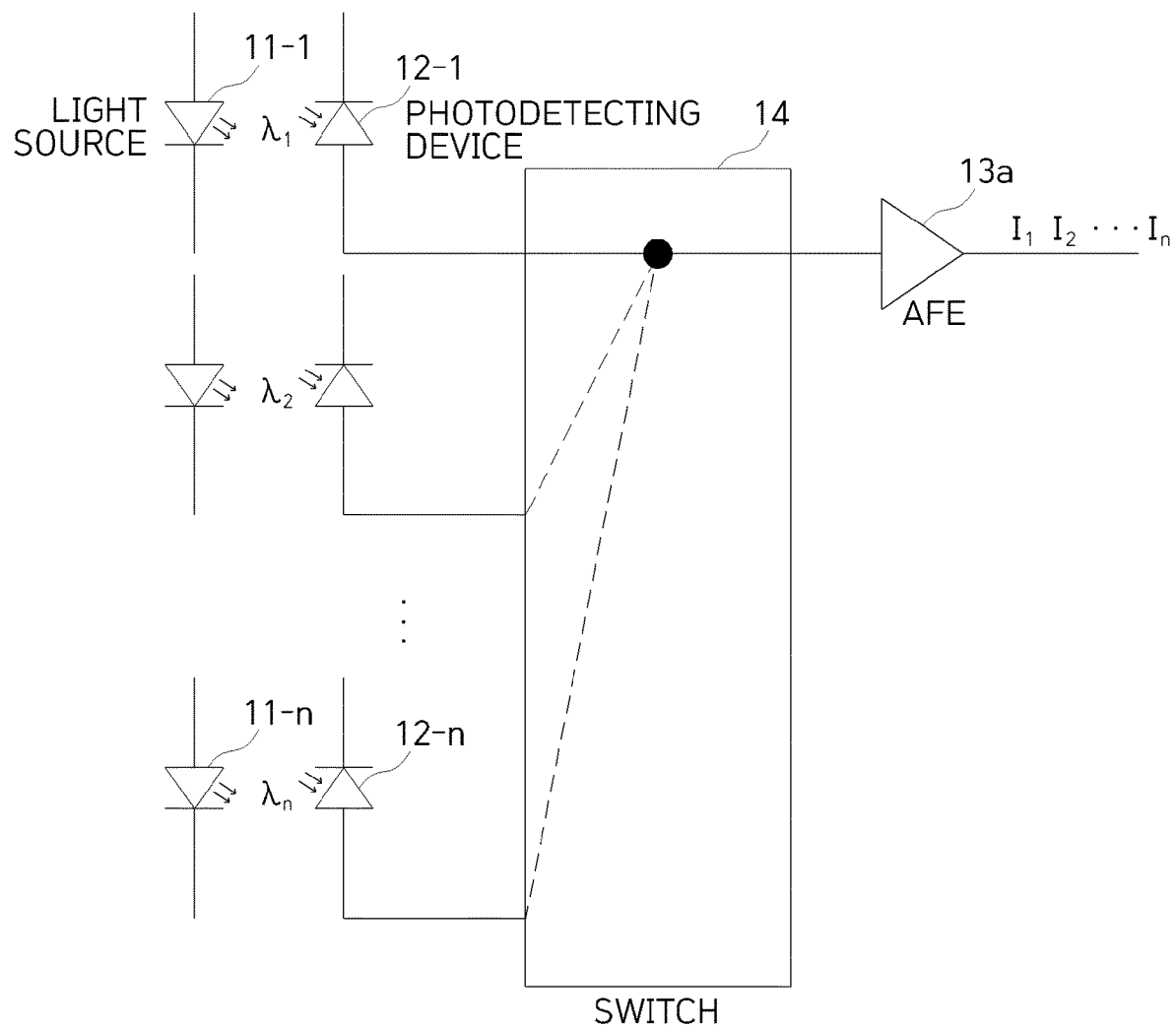
FIG. 4 is a diagram showing a structure in which a single AFE is shared in a multiple-wavelength-based configuration of light sources and photodetecting devices.

FIG. 4 is a diagram showing a structure in which a single AFE 13a is shared in a multiple-wavelength-based configuration of light sources 11-1 to 11-n and the photodetecting devices 12-1 to 12-n.

The plurality of photodetecting devices 12-1 to 12-n for measuring a plurality of wavelengths may share one AFE 13a through switching. In this regard, a switch 14 may be formed as an independent configuration as shown in FIG. 4, or included inside the AFE 13a.

Figure 5:
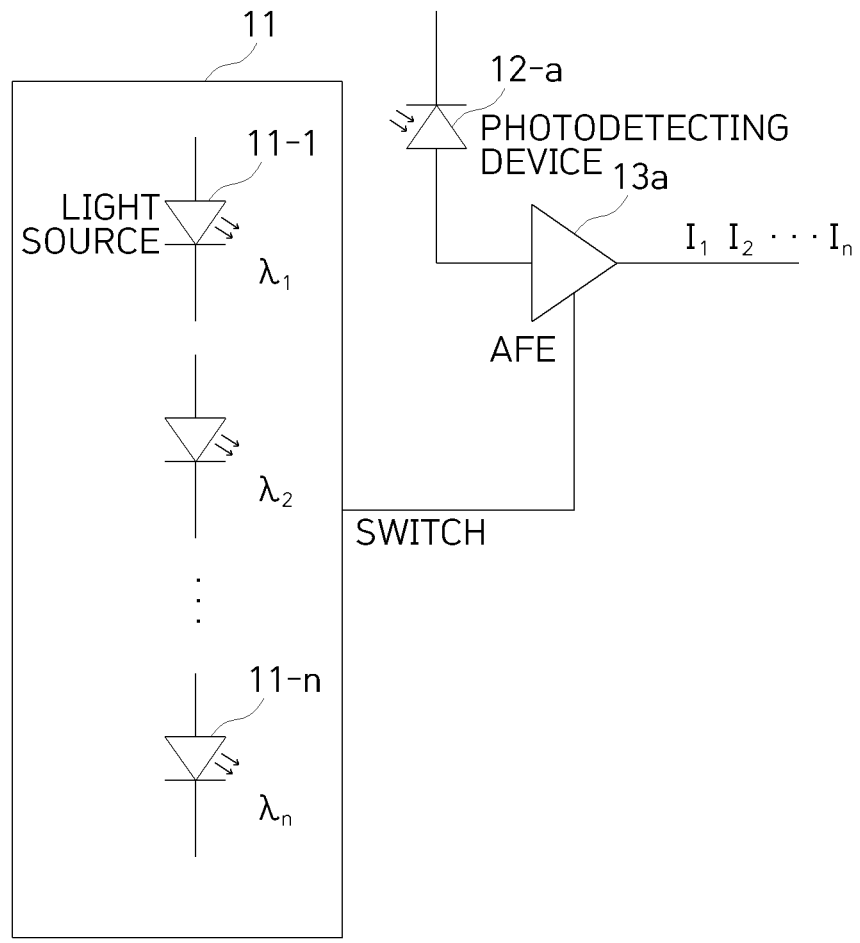
FIG. 5 is a diagram showing a structure in which a single photodetecting device and a single AFE are shared in a multiple-wavelength-based configuration of light sources and photodetecting devices.

FIG. 5 is a diagram showing a structure in which a single photodetecting device 12a and a single AFE 13a are shared in a multiple-wavelength-based configuration of light sources 11-1 to 11-n and the photodetecting device 12a.

FIG. 5 shows a structure including one photodetecting device 12a and one AFE 13a which have a broadband characteristic for the plurality of light sources 11-1 to 11-n to measure a plurality of wavelengths. In this regard, a plurality of wavelengths may be measured by switching the plurality of light sources 11-1 to 11-n from the AFE 13a, and the switch may be included in the AFE 13a.

Figure 6A:
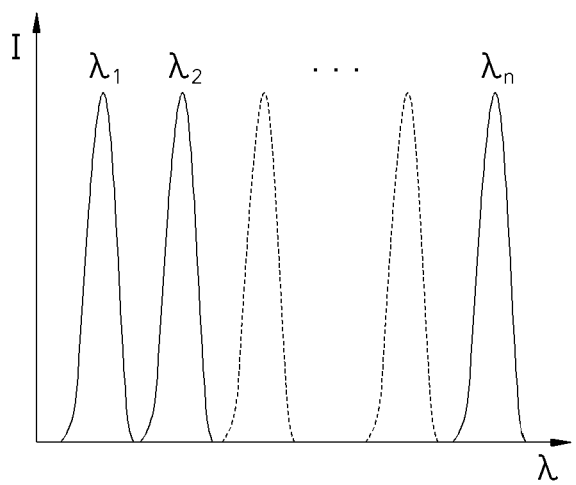
FIGS. 6A and 6B are diagrams showing measurement values of the photodetecting device(s) for n wavelengths measured through the structures of FIGS. 3 to 5 in a wavelength domain and a time domain, respectively.
Figure 6B:
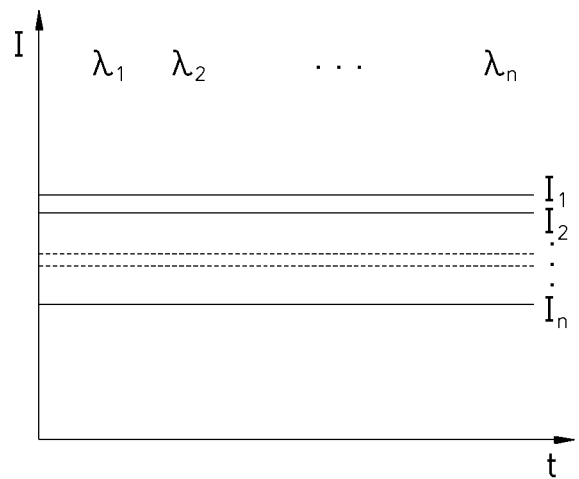

FIGS. 6A and 6B are diagrams showing measurement values of the photodetecting device(s) for n wavelengths measured through the structures of FIGS. 3 to 5 in a wavelength domain and a time domain, respectively.

Figure 7:
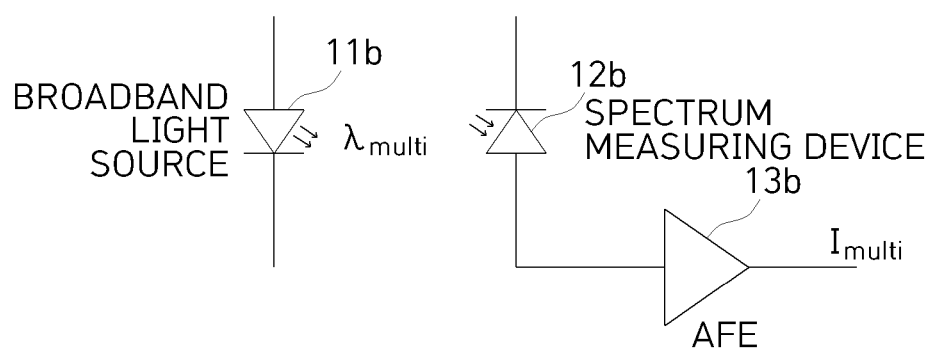
FIG. 7 is a diagram showing a structure for generating a plurality of wavelengths based on a single light source.

FIG. 7 is a diagram showing a structure for generating a plurality of wavelengths based on a single light source 11b.

Meanwhile, a plurality of wavelengths do not necessarily require a plurality of light sources. Even though being the single light source 11b, an incandescent lamp, a halogen lamp, or a broadband LED lamp may generate a plurality of continuous wavelengths as the single light source 11b.

In addition, intensities for a plurality of wavelengths may be measured through a spectrometer-based spectrum measuring device 12b.

Figure 8A:
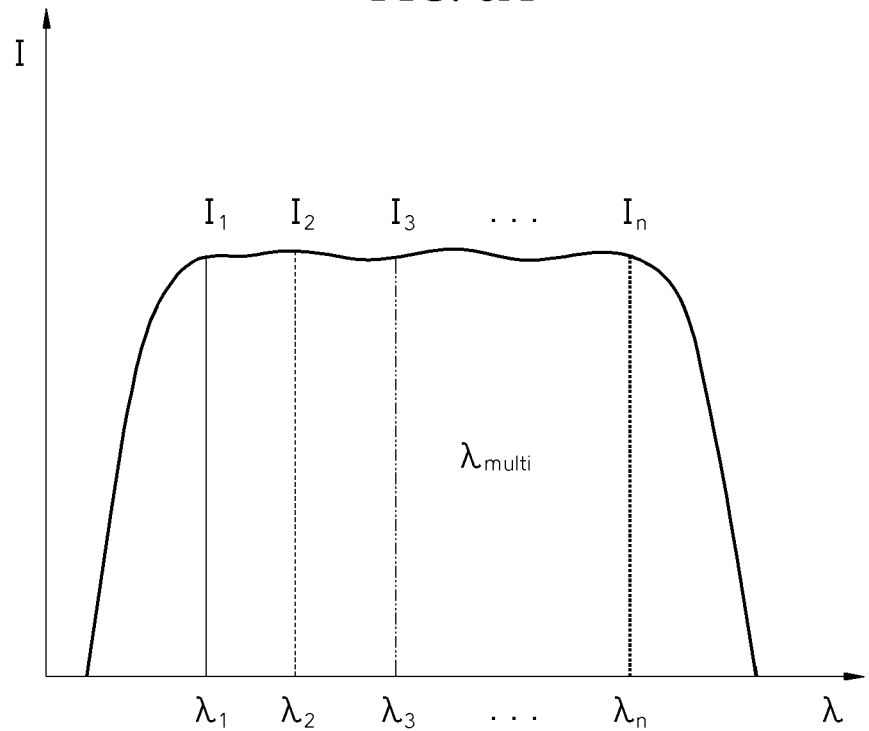
FIGS. 8A and 8B are diagrams showing measurement values of the spectrum measuring device for the broadband wavelength measured through the structure of FIG. 7 in a wavelength domain and a time domain, respectively.
Figure 8B:
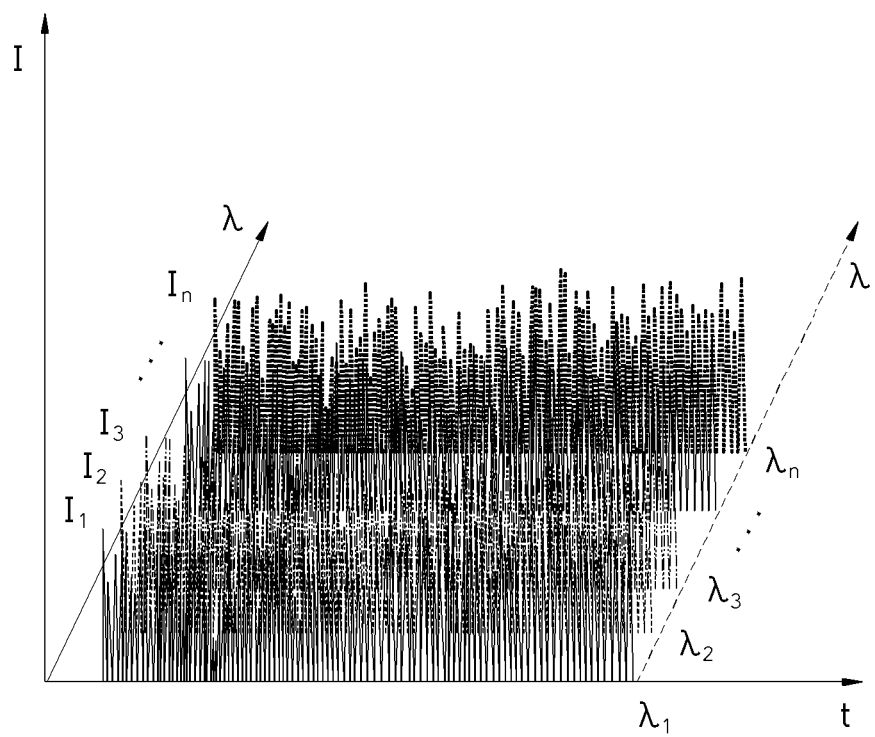

FIGS. 8A and 8B are diagrams showing measurement values of the spectrum measuring device for the broadband wavelength measured through the structure of FIG. 7 in a wavelength domain and a time domain, respectively.

Here, the wavelength of the broadband light source is a continuous analog value (FIG. 8A), and the measured wavelength value of the spectrum measuring device is outputted as a discrete signal value according to the sensitivity and resolution of the spectrum measuring device (FIG. 8B). Therefore, the measurement value of the nth wavelength may vary depending on the performance of the spectrum measuring device.

Figure 9:
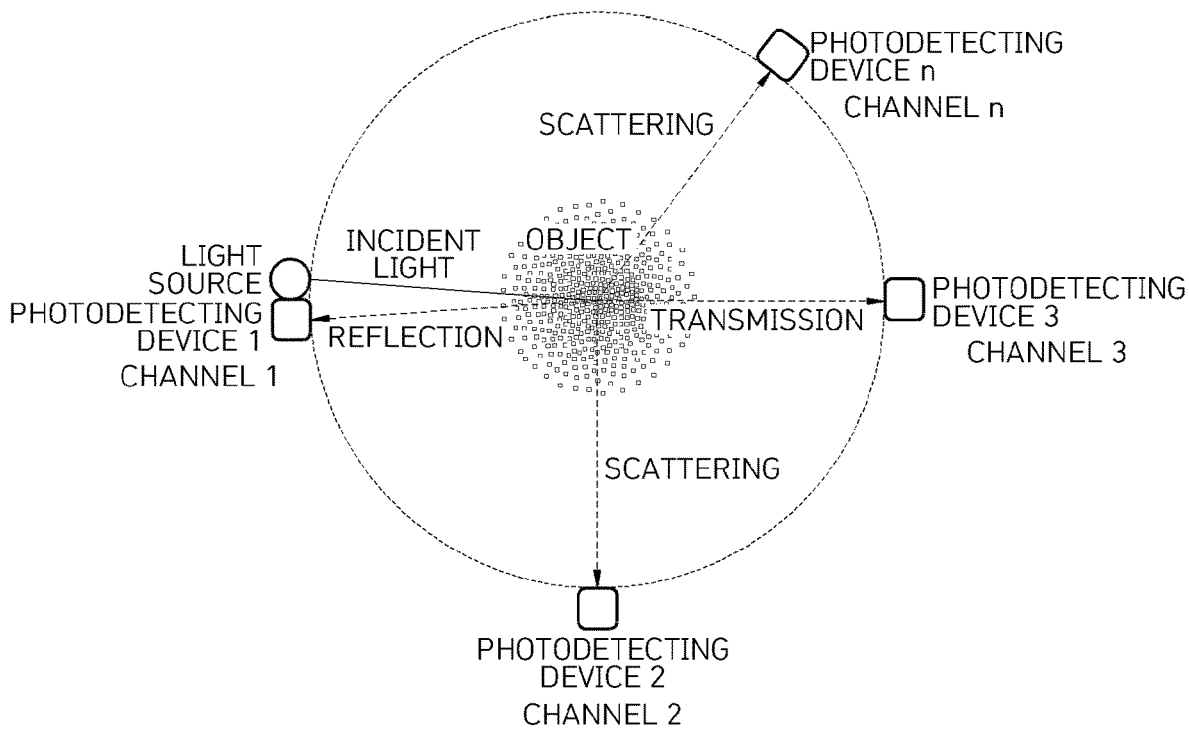
FIG. 9 is a diagram showing reflection, scattering, and transmission of incident light with respect to an object according to relative positions of a light source and a photodetecting device.
Figure 10:
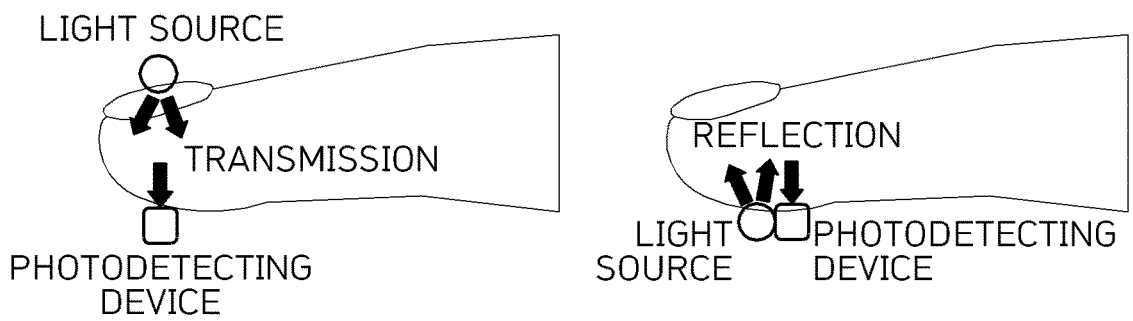
FIG. 10 is a diagram illustrating a photo-plethysmography (PPG) measurement principle wherein a human finger is measured as the object in accordance with an embodiment of FIG. 9.
Figure 11A:
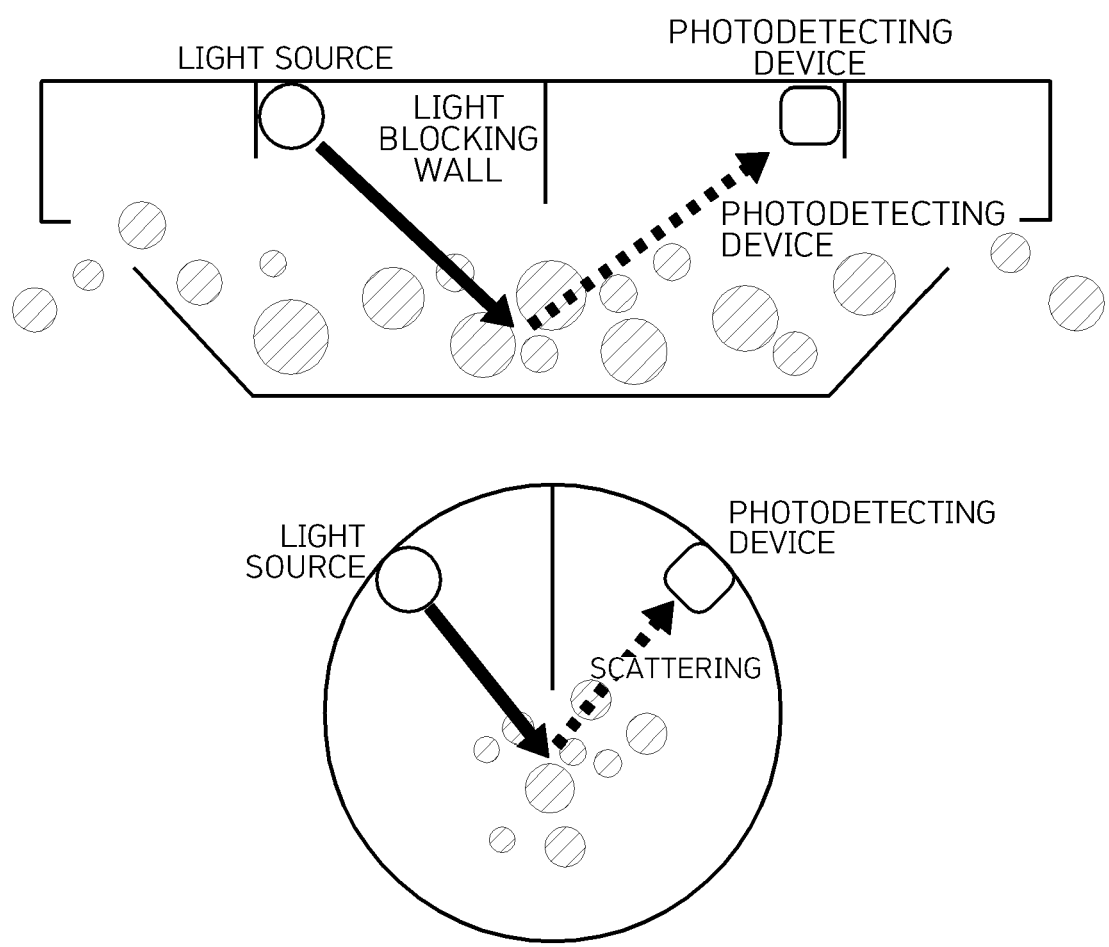
FIGS. 11A to 11C are diagrams illustrating a measurement principle of a photoelectric smoke detector for detecting a fire with smoke particles according to an embodiment of FIG. 9.
Figure 11B:
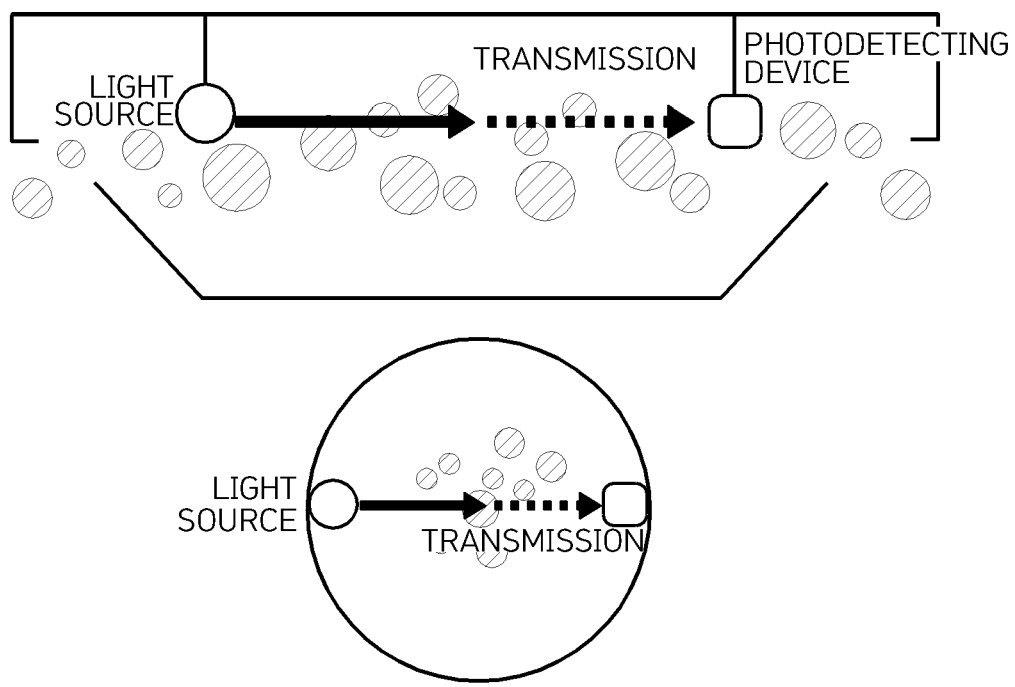
Figure 11C:
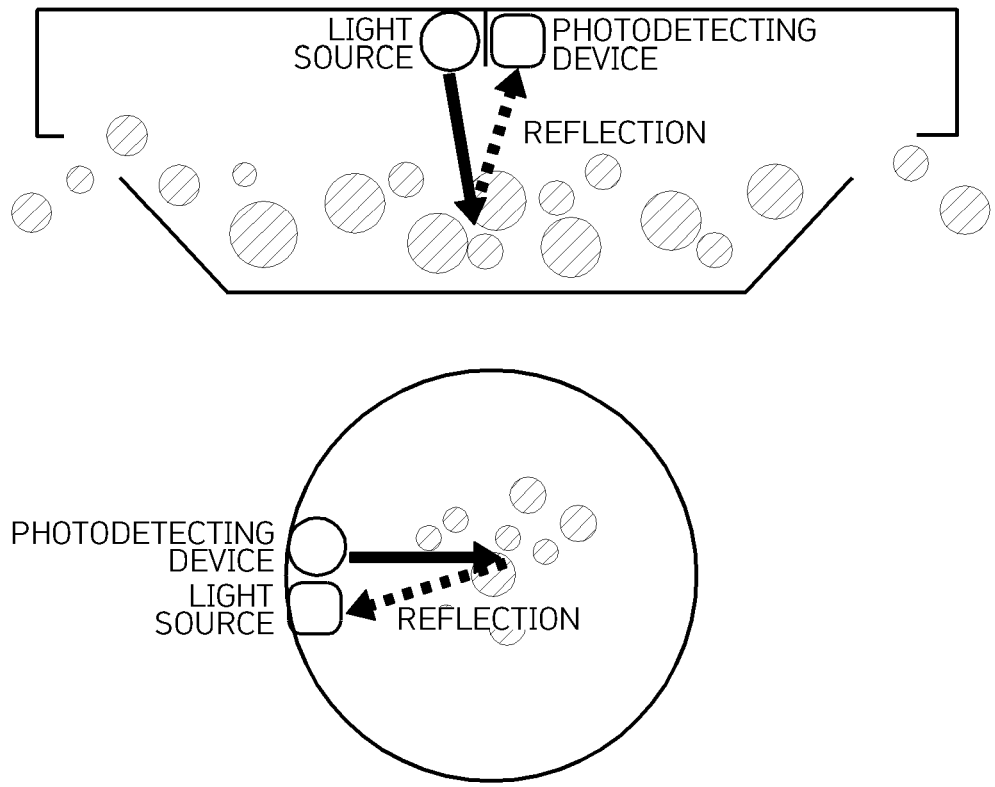

FIG. 9 is a diagram showing reflection, scattering, and transmission of incident light with respect to an object according to relative positions of a light source and a photodetecting device. FIG. 10 is a diagram illustrating a photo-plethysmography (PPG) measurement principle wherein a human finger is measured as the object in accordance with an embodiment of FIG. 9. FIGS. 11A to 11C are diagrams illustrating a measurement principle of a photo-electric smoke detector for detecting a fire with smoke particles according to an embodiment of FIG. 9.

Light has properties of reflection, scattering, absorption, and transmission depending on the object, that is, gas, liquid, or solid particles, to which the light is radiated. At this time, the degrees of reflection, scattering, and transmission can be directly measured by the combination of the positions of the light source and the photodetecting device, and absorption can be calculated through the measurement values of reflection, scattering, and transmission.

Here, a plurality of photodetecting devices may be employed for the measurement for a single incident light, and at this time, an output signal of the photodetecting device for measuring characteristics of light such as reflection, scattering, and transmission is referred to as a channel. For example, when one light source having a plurality of wavelengths and two photodetecting devices, such as a photodetecting device for reflection measurement and a photodetecting device for transmission measurement, are used, this is referred to as two channels being used.

In addition, examples of the object include most substances, such as gaseous substances (e.g., smoke particles, dust, and gas), liquid substances (e.g., gasoline and water), and solid substances (e.g., human finger and fruit), with respect to which reflection, scattering, and transmission occur by light.

Hereinafter, an optical feature information extraction system 100 according to an embodiment of the present disclosure will be described with reference to FIGS. 12 to 17. Meanwhile, for convenience, the detailed description of the present disclosure is made herein for a case where four wavelengths are used, but the disclosure is not necessarily limited to this case.

Figure 12:
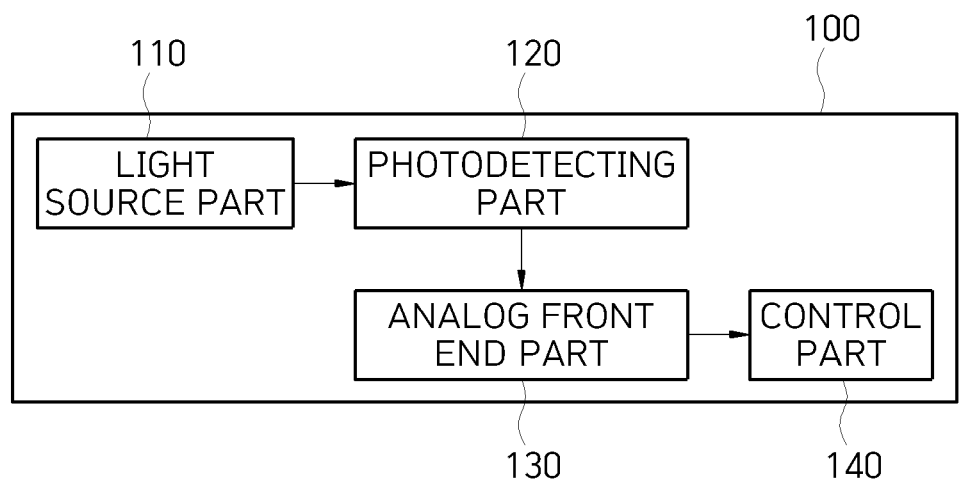
FIG. 12 is a block diagram of an optical feature information extraction system according to a first embodiment of the present disclosure.

FIG. 12 is a block diagram of an optical feature information extraction system 100 according to a first embodiment of the present disclosure.

The optical feature information extraction system 100 according to an embodiment of the present disclosure includes a light source part 110, a photodetecting part 120, an analog front end part 130, and a control part 140.

The light source part 110 generates light having a plurality of wavelengths. In this regard, the light source part 110 may be constituted with a plurality of light sources, each of which generates light corresponding to each of the plurality of wavelengths.

The photodetecting part 120 detects light of respective wavelengths by any one of scattering, transmission, and reflection of the light generated by the light source with respect to an object. In this regard, when the light source part 110 is constituted with of a plurality of light sources, the photodetecting part 120 may have a wavelength bandwidth with which it is capable of detecting all of the plurality of wavelengths.

The analog front end part 130 amplifies the measurement value of the photodetecting part 120. At this time, a value measured corresponding to the object in the photodetecting part 120 is referred to as a first measurement value.

The control part 140 extracts optical feature values for the object based on the amplified first measurement value.

Figure 13:
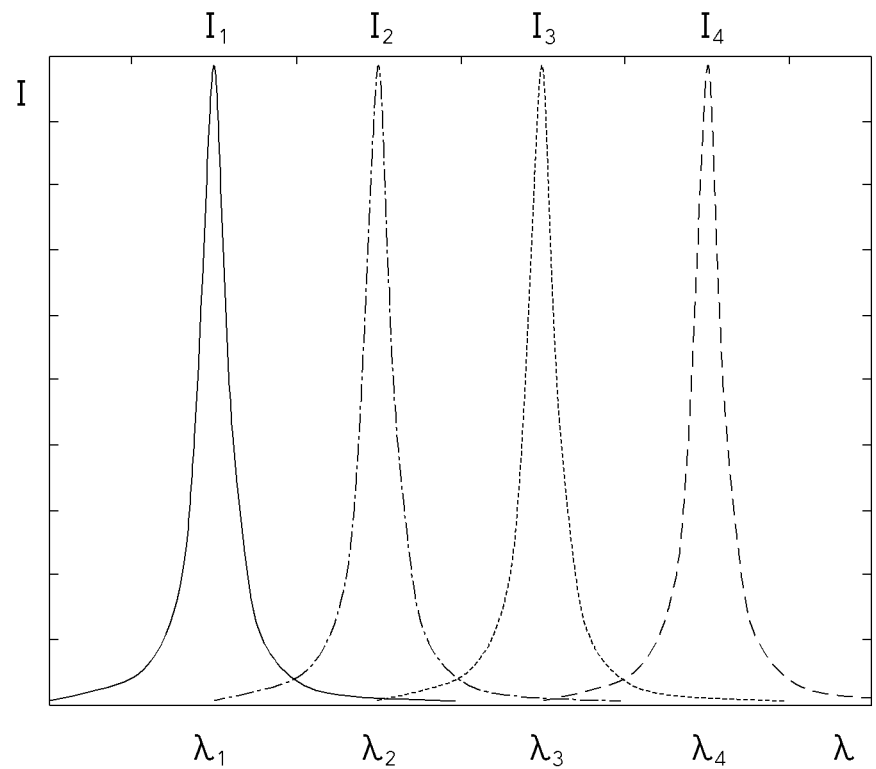
FIG. 13 is a diagram showing the magnitudes of outputs of light sources of four wavelengths on the wavelength axis.

FIG. 13 is a diagram showing the magnitudes of outputs of light sources of four wavelengths on the wavelength axis.

In an embodiment of the present disclosure, as shown in the configuration of FIG. 5, the number of light sources generating a plurality of wavelengths may be four (n=4), that is, they may be constituted with a first wavelength $\lambda 1$, a second wavelength $\lambda 2$, a third wavelength $\lambda 3$, and a fourth wavelength $\lambda 4$. Also, the photodetecting part 120 may have a wavelength bandwidth with which it is capable of detecting all of the first wavelength $\lambda 1$, the second wavelength $\lambda 2$, the third wavelength $\lambda 3$, and the fourth wavelength $\lambda 4$, and may control the light source through a switch included in the analog front end part 130.

As an example, the control part 140 may obtain an amplified second measurement value of the photodetecting part 120 for respective wavelengths in a state in which no object is present. And, the control part 140 may normalize respective first measurement values for respective wavelengths based on the second measurement value.

Figure 14:
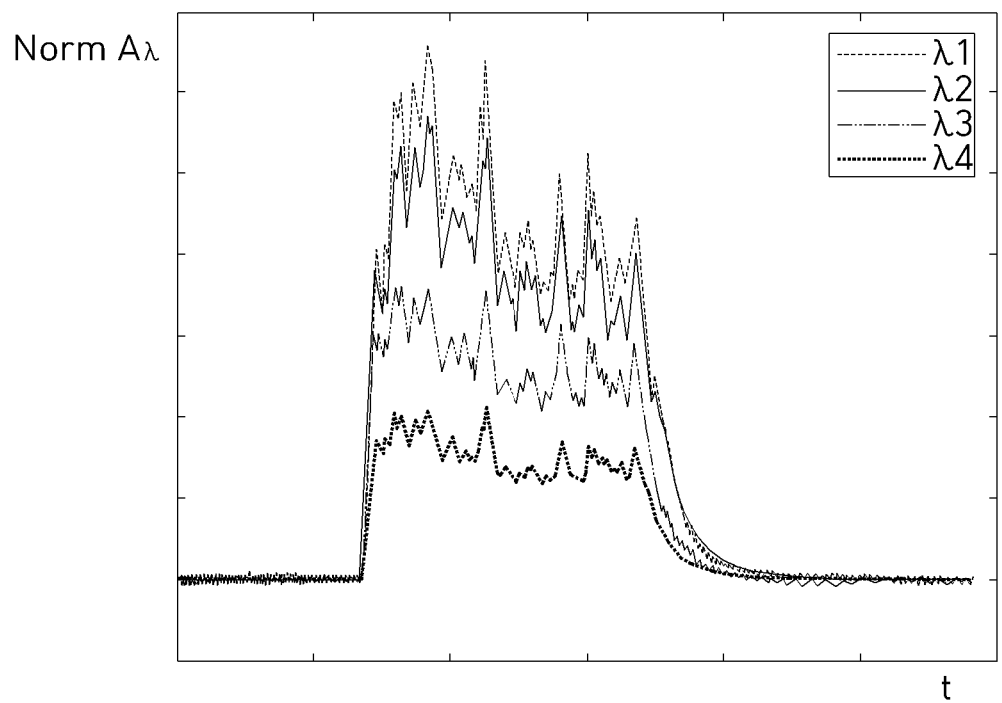
FIG. 14 is a diagram showing an example of a result of normalizing the first measurement value based on the second measurement value in an embodiment of the present disclosure.

FIG. 14 is a diagram showing an example of a result of normalizing the first measurement value based on the second measurement value in an embodiment of the present disclosure.

FIG. 14 is, for example, a diagram showing magnitudes NormA$\lambda$ of normalizing I1, I2, I3, and I4, respectively, which are the first measurement values obtained from the photodetecting device by measuring the scattered light of respective wavelengths by the object, based on the second measurement values of the photodetecting part for respective wavelengths in a state in which no object is present.

In an example, the control part 140 may obtain the concentration-based optical feature information for the object through the sum value of the normalized first measurement values for the respective wavelengths.

Figure 15:
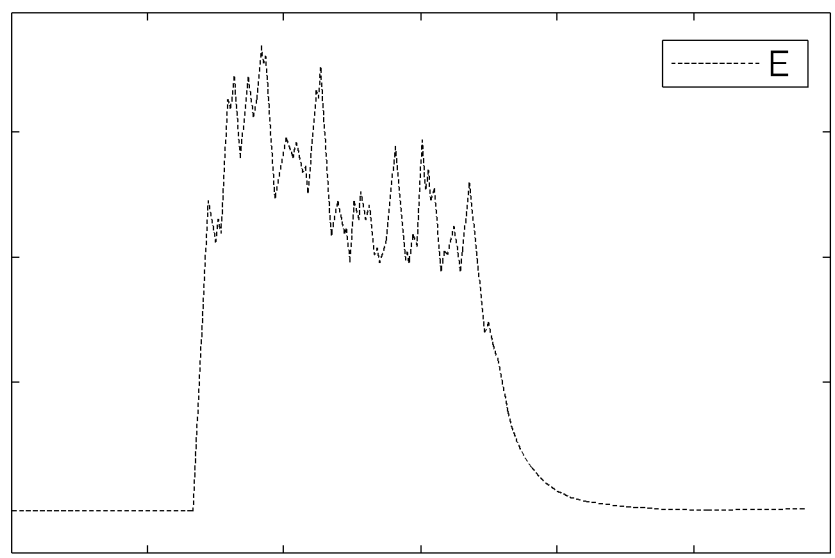
FIG. 15 is a diagram showing an example of a result of summing up the first measurement values in an embodiment of the present disclosure.

FIG. 15 is a diagram showing an example of a result of summing up the first measurement values in an embodiment of the present disclosure.

NormAλ, which is the first measurement values normalized for scattered light of the above-mentioned four wavelengths, may be expressed as in Equation 1. And the sum value E obtained by summing all the first measurement values may be expressed as Equation 2 and FIG. 15.

$$Norm\ A_\lambda = \begin{bmatrix} Norm\ A_1 \\ Norm\ A_2 \\ Norm\ A_3 \\ Norm\ A_4 \end{bmatrix} \quad \text{[Equation 1]}$$

$$E = \sum_{\lambda=1}^{4} Norm A_\lambda = Norm A_1 + Norm A_2 + Norm A_3 + Norm A_4 \quad \text{[Equation 2]}$$

At this time, in one embodiment of the present disclosure, the concentration of the object can be inferred through the normalized first measurement value $NormA_\lambda$ according to Equation 1 and the magnitude of the sum value E according to Equation 2. However, it is difficult to know the unique characteristics of an object only with Equations 1 and 2.

Therefore, an embodiment of the present disclosure provides an algorithm for deriving optical feature values in order to know the substance characteristics of an object from Equation 1.

In an example, the control part 140 generates matrix information in which difference values between normalized first measurement values are used as respective element values of a matrix. And the control part 140 calculates an eigenvalue and an eigenvector for the matrix information based on the respective element values of the matrix constituting the matrix information. Then, the control part 140 may obtain respective element values of the eigenvector as the optical feature values.

Equation 3 below shows matrix information D in which the difference value between the normalized first measurement values calculated through Equation 1 is the value $d_{ij}$ of each matrix element. That is, D represents the similarity between detection signals which have responded to four wavelengths (n=4).

$$D = \begin{bmatrix} d_{11} & d_{12} & d_{13} & d_{14} \\ d_{21} & d_{22} & d_{23} & d_{24} \\ d_{31} & d_{32} & d_{33} & d_{34} \\ d_{41} & d_{42} & d_{43} & d_{44} \end{bmatrix} \quad \text{[Equation 3]}$$

$$d_{ij} = |Norm\ A_i - Norm\ A_j|\ i, j = 1, 2, 3, 4$$

In addition, Equation 4 is a matrix S in which $s_{ij}$ is calculated with respective matrix element values of the matrix information D calculated in Equation 3 with four wavelengths (n=4). The matrix S is an equation for obtaining, by vector inner product, the optimal distribution between elements from the center point of the similarity D between the detection signals which have responded to the four wavelengths (n=4).

$$S = \begin{bmatrix} s_{11} & s_{12} & s_{13} & s_{14} \\ s_{21} & s_{22} & s_{23} & s_{24} \\ s_{31} & s_{32} & s_{33} & s_{34} \\ s_{41} & s_{42} & s_{43} & s_{44} \end{bmatrix} \quad \text{[Equation 4]}$$

$$s_{ij} = -\frac{1}{2}\left[ d_{ij}^2 - \frac{1}{n}\sum_{q=1}^{n} d_{iq}^2 - \frac{1}{n}\sum_{p=1}^{n} d_{pj}^2 + \frac{1}{n^2}\sum_{g=1}^{n}\sum_{h=1}^{n} d_{gh}^2 \right]$$

Figure 16:
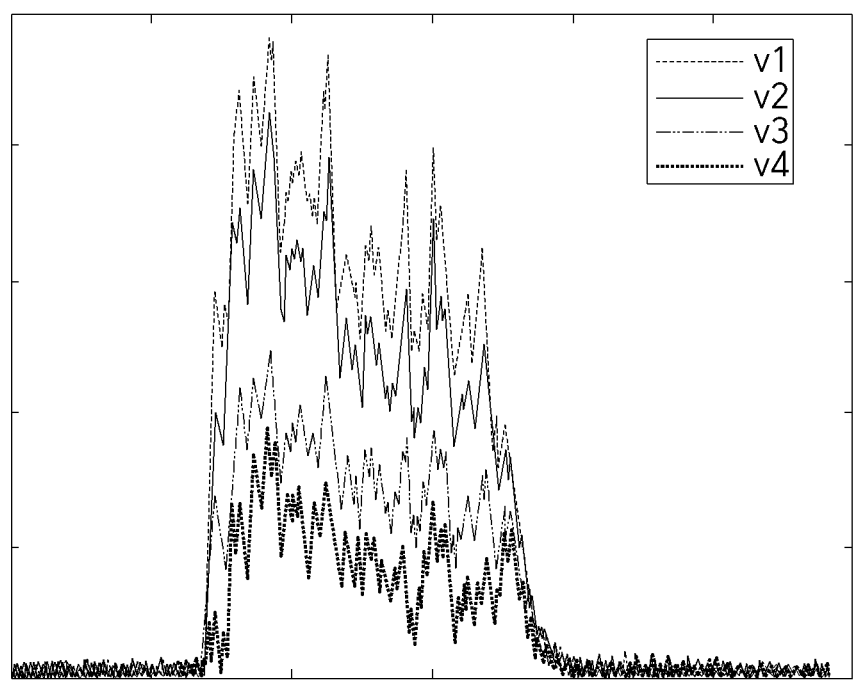
FIG. 16 shows optical feature values that are respective elements of an eigenvector corresponding to normalized first measurement values.

FIG. 16 shows optical feature values that are respective elements of an eigenvector corresponding to normalized first measurement values.

And following Equation 5 shows the eigenvalue λ and eigenvector v for the matrix information S of Equation 4, and Equation 6 represents respective elements for the eigenvector v of Equation 5.

$$Sv = \lambda v \quad \text{[Equation 5]}$$

$$v = \begin{bmatrix} v_1 \\ v_2 \\ v_3 \\ v_4 \end{bmatrix} \quad \text{[Equation 6]}$$

Figure 17A:
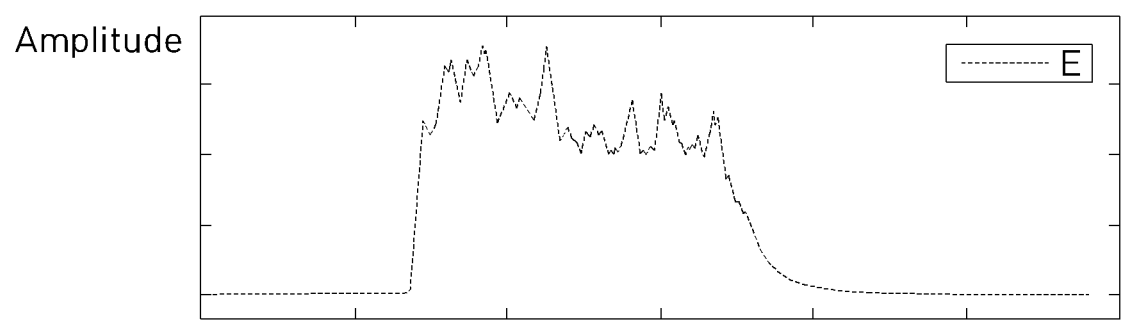
FIGS. 17A and 17B are diagrams showing angle information for obtaining a sum value of normalized first measurement values and feature information for an object.
Figure 17B:
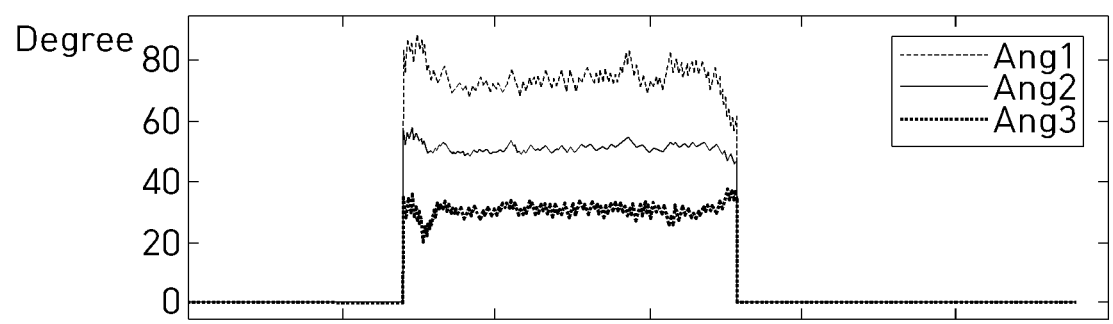

FIGS. 17A and 17B are diagrams showing angle information for obtaining a sum value of normalized first measurement values and feature information for an object.

As an embodiment, the control part 140 may calculate ratio information between respective element values corresponding to the optical feature values, and obtain the feature information for an object based on the angle information obtained through the ratio information.

In order to know the substance characteristics of an object, a conditional expression (Equation 7) derived as the substance characteristics by combining optical feature values may be obtained. For example, in an embodiment of the present disclosure, angle information formed by a ratio between eigenvectors may be calculated and obtained as feature information for an object.

$$\begin{aligned} Ang1 &= \tan^{-1}\left(\frac{v_4}{v_1}\right) \\ Ang2 &= \tan^{-1}\left(\frac{v_4}{v_3}\right) \\ Ang3 &= \tan^{-1}\left(\frac{v_2}{v_1}\right) \\ &\vdots \end{aligned} \quad \text{[Equation 7]}$$

Meanwhile, in an embodiment of the present disclosure, the conditional expression for classifying the substance characteristics of an object using optical feature values is not limited to the above-described Equation 7, and can be derived from values of various combinations of optical feature values according to Equation 6.

Hereinafter, an optical feature information extraction system 200 according to another embodiment of the present disclosure will be described with reference to FIGS. 18 to 22. Another embodiment of the present disclosure provides detailed description about a case where a plurality of photodetecting devices 220-1 to 220-n are used to measure characteristics such as reflection, scattering, and transmission of light, that is, an exemplary example of extracting feature points by measuring a plurality of channels.

Figure 18:
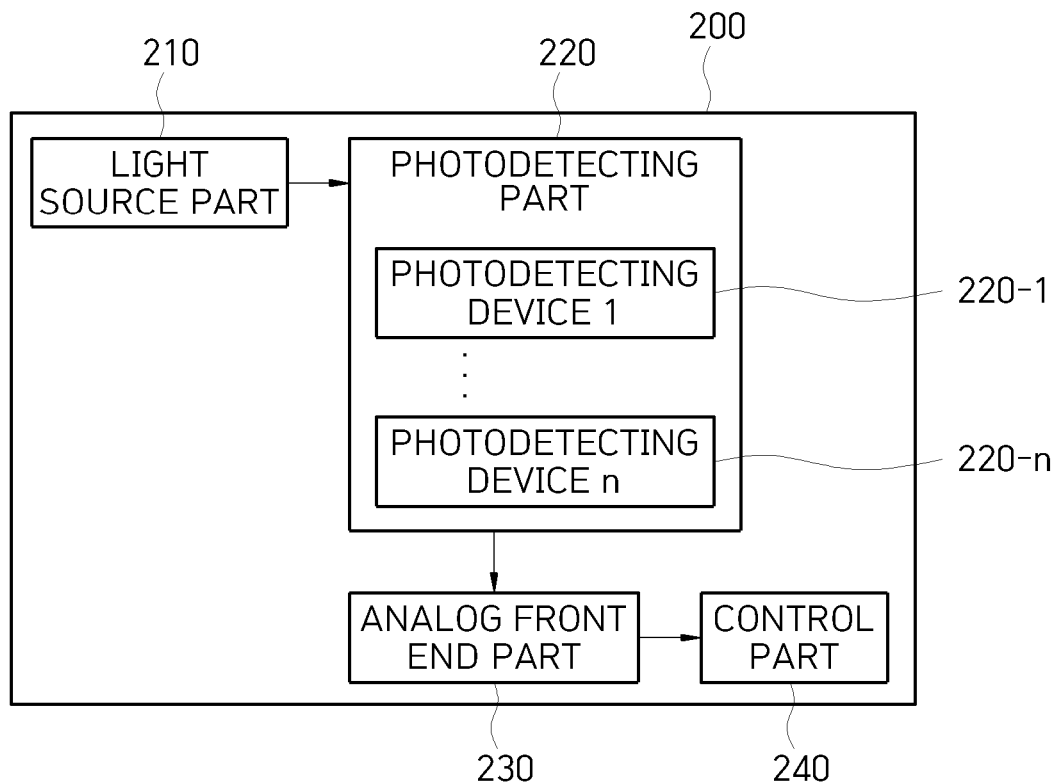
FIG. 18 is a block diagram of an optical feature information extraction system according to a second embodiment of the present disclosure.

FIG. 18 is a block diagram of an optical feature information extraction system 200 according to a second embodiment of the present disclosure.

The optical feature information extraction system 200 according to an embodiment of the present disclosure includes a light source part 210, a photodetecting part 220, an analog front end part 230, and a control part 240.

The light source part 210 generates light having a plurality of wavelengths. In this regard, the light source part 210 may be constituted with a plurality of light sources, each of which generates light corresponding to each of the plurality of wavelengths.

The photodetecting part 220 detects light of respective wavelengths by two or more of scattering, transmission, and reflection of the light generated by the light source with respect to an object. That is, in the second embodiment of the present disclosure, optical feature values are extracted based on the plurality of channels 220-1 to 220-n.

The analog front end part 230 amplifies a plurality of first measurement values corresponding to respective channels in the photodetecting part 220.

The control part 240 extracts optical feature values for an object based on the amplified first measurement values.

Meanwhile, in an embodiment of the present disclosure, the number of light sources generating a plurality of wavelengths may be four (n=4), that is, they may be constituted with a first wavelength $\lambda 1$, a second wavelength $\lambda 2$, a third wavelength $\lambda 3$, and a fourth wavelength $\lambda 4$. Additionally, the plurality of photodetecting devices 220-1 to 220-n may include, for example, two-channel photodetecting device for measuring scattering and transmission. In this regard, each of the photodetecting devices 220-1 to 220-n may have a wavelength bandwidth with which it is capable of detecting all of the first wavelength $\lambda 1$, the second wavelength $\lambda 2$, the third wavelength $\lambda 3$, and the fourth wavelength $\lambda 4$, and may control the light source through a switch included in the analog front end part 230.

In an embodiment, the control part 240 may obtain a plurality of amplified second measurement values corresponding to respective channels of the photodetecting part 220 for respective wavelengths in a state in which no object is present, and may normalize the first measurement values for each channel for the respective wavelengths based on the plurality of second measurement values.

Figure 19A:
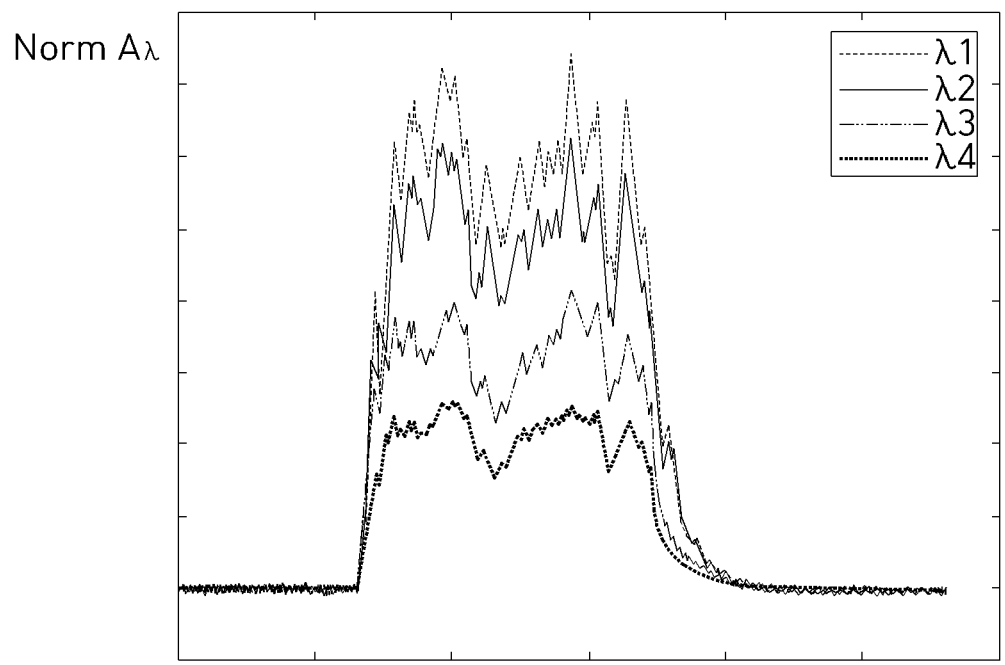
FIGS. 19A and 19B are diagrams showing an example of a result of normalizing the first measurement values based on the second measurement values in an embodiment of the present disclosure.
Figure 19B:
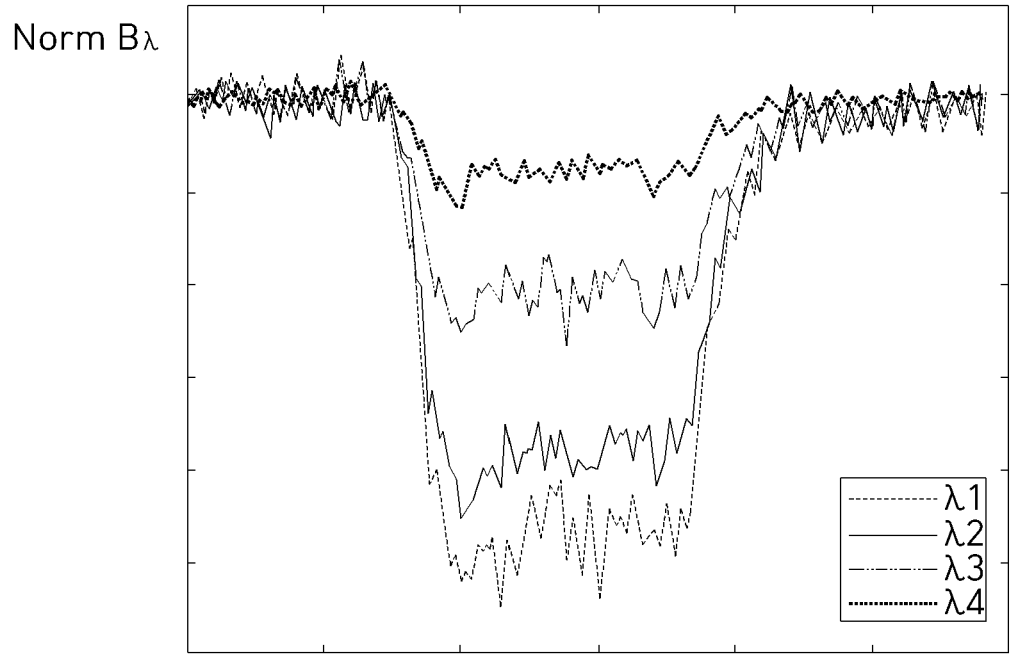

FIGS. 19A and 19B are diagrams showing an example of a result of normalizing the first measurement values based on the second measurement values in an embodiment of the present disclosure.

FIG. 19A shows the normalized magnitude Norm Ax based on the second measurement values of the first channel photodetecting device in a state in which no object is present, after measuring the scattered light of respective wavelengths by the object (first measurement values). Similarly, FIG. 19B shows the normalized magnitude Norm B) based on the second measurement values of the second channel photodetecting device in a state in which no object is present, after measuring the transmitted light of respective wavelength by the object (first measurement values).

In an example, the control part 240 may obtain the concentration-based optical feature information of the object through the sum value of the normalized first measurement values for the respective wavelengths.

Figure 20A:
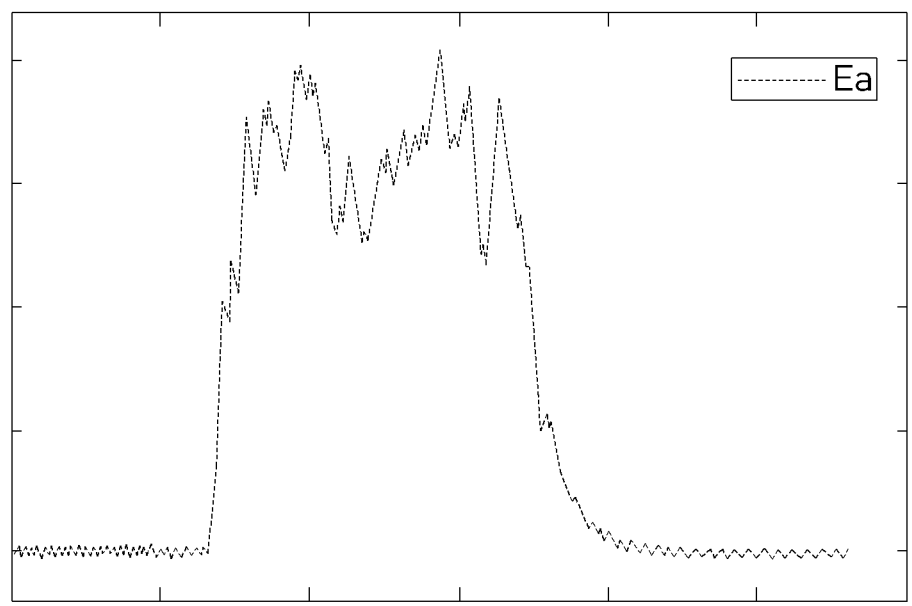
FIGS. 20A and 20B are diagrams showing an example of a result of summing up the first measurement values in an embodiment of the present disclosure.
Figure 20B:
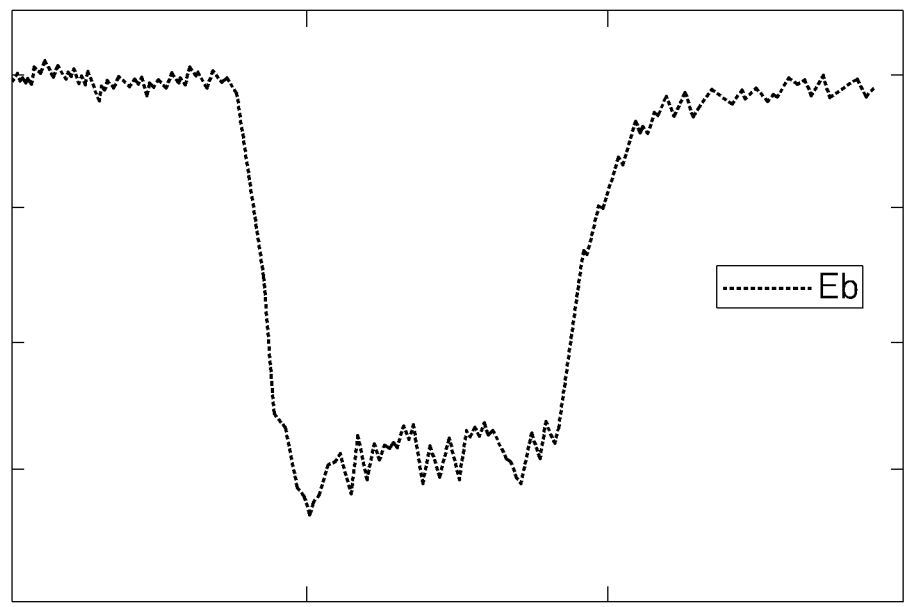

FIGS. 20A and 20B are diagrams showing an example of a result of summing up the first measurement values in an embodiment of the present disclosure.

Norm $A_\lambda$, which is the first measurement value normalized for the above-mentioned four wavelengths of scattered light, may be expressed as Equation 8a, and the sum value $E_a$ obtained by summing all the first measurement values may be expressed as Equation 9a. The sum value $E_a$ calculated through Equation 9a may be expressed as shown in FIG. 20A.

Similarly, Norm $B_\lambda$, which is the first measurement value normalized for the above-mentioned four wavelengths of transmitted light, may be expressed as Equation 8b, and the sum value $E_b$ obtained by summing all the first measurement values may be expressed as Equation 9b. The sum value E; calculated through Equation 9b may be expressed as shown in FIG. 20B.

$$Norm\ A_\lambda = \begin{bmatrix} Norm\ A_1 \\ Norm\ A_2 \\ Norm\ A_3 \\ Norm\ A_4 \end{bmatrix} \quad \text{[Equation 8a]}$$

$$Norm\ B_\lambda = \begin{bmatrix} Norm\ B_1 \\ Norm\ B_2 \\ Norm\ B_3 \\ Norm\ B_4 \end{bmatrix} \quad \text{[Equation 8b]}$$

$$E_a = \sum_{\lambda=1}^{4} NormA_\lambda = NormA_1 + NormA_2 + NormA_3 + NormA_4 \quad \text{[Equation 9a]}$$

$$E_b = \sum_{\lambda=1}^{4} NormB_\lambda = NormB_1 + NormB_2 + NormB_3 + NormB_4 \quad \text{[Equation 9b]}$$

At this time, in an embodiment of the present disclosure, the concentration of the object can be inferred through the normalized first measurement value Norm Ax according to Equation 8a, the normalized first measurement value Norm $B_\lambda$ according to Equation 8b, the sum value $E_a$ according to Equation 9a, and the magnitude of the sum value $E_b$, according to Equation 9b. However, it is difficult to know the unique characteristics of an object only with Equations 8a to 9b.

Therefore, an embodiment of the present disclosure provides an algorithm for deriving optical feature values in order to know the substance characteristics of an object from Equations 8a and 8b.

In an embodiment, the control part 240 generates matrix information in which each matrix element value is a vector sum for difference value in correlation magnitudes between normalized first measurement values for each channel. And the control part calculates an eigenvalue and an eigenvector based on each matrix element value constituting matrix information. Then, the control part 240 may obtain respective element values of the eigenvector as the optical feature values.

Following Equation 10 shows matrix information D in which each matrix element value $d_{ij}$ is a vector sum for difference values in correlation magnitudes between normalized first feature values calculated through Equations 8a and 8b. That is, matrix information D in Equation 10 represents the similarity between detection signals which have responded to four wavelengths (n=4).

$$D = \begin{bmatrix} d_{11} & d_{12} & d_{13} & d_{14} \\ d_{21} & d_{22} & d_{23} & d_{24} \\ d_{31} & d_{32} & d_{33} & d_{34} \\ d_{41} & d_{42} & d_{43} & d_{44} \end{bmatrix} \quad \text{[Equation 10]}$$

-continued $$d_{ij} = \sqrt{(NormA_i - NormA_j)^2 + (NormB_i - NormB_j)^2} \; i, j = 1, 2, 3, 4$$

In addition, Equation 11 is a matrix S in which $s_{ij}$ is calculated with respective matrix element values of the matrix information D calculated in Equation 10 with four wavelengths (n=4). The matrix S is an equation for obtaining, by vector inner product, the optimal distribution between elements from the center point of the similarity D between the detection signals which have responded to the four wavelengths (n=4).

$$S = \begin{bmatrix} s_{11} & s_{12} & s_{13} & s_{14} \\ s_{21} & s_{22} & s_{23} & s_{24} \\ s_{31} & s_{32} & s_{33} & s_{34} \\ s_{41} & s_{42} & s_{43} & s_{44} \end{bmatrix} \quad \text{[Equation 11]}$$

$$s_{ij} = -\frac{1}{2}\left[ d_{ij}^2 - \frac{1}{n}\sum_{q=1}^{n} d_{iq}^2 - \frac{1}{n}\sum_{p=1}^{n} d_{pj}^2 + \frac{1}{n^2}\sum_{g=1}^{n}\sum_{h=1}^{n} d_{gh}^2 \right]$$

Figure 21:
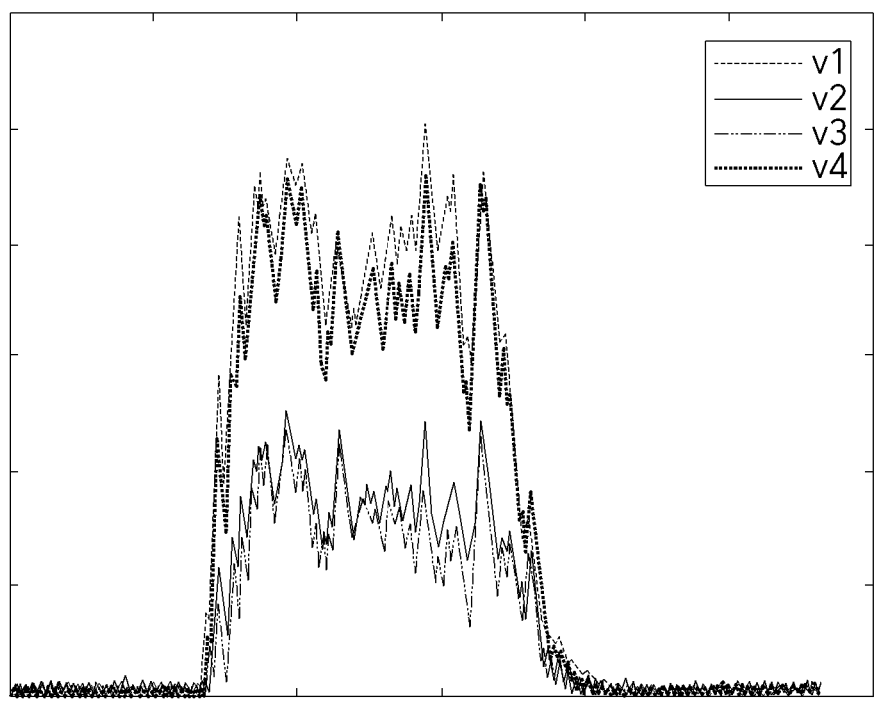
FIG. 21 shows optical feature values that are respective elements of an eigenvector corresponding to normalized first feature values.

FIG. 21 shows optical feature values that are respective elements of an eigenvector corresponding to normalized first feature values.

Following Equation 12 shows the eigenvalue λ and eigenvector v for the matrix information S of Equation 11, and Equation 13 represents respective elements for the eigenvector v of Equation 12.

$$Sv = \lambda v \quad \text{[Equation 12]}$$

$$v = \begin{bmatrix} v_1 \\ v_2 \\ v_3 \\ v_4 \end{bmatrix} \quad \text{[Equation 13]}$$

Figure 22A:
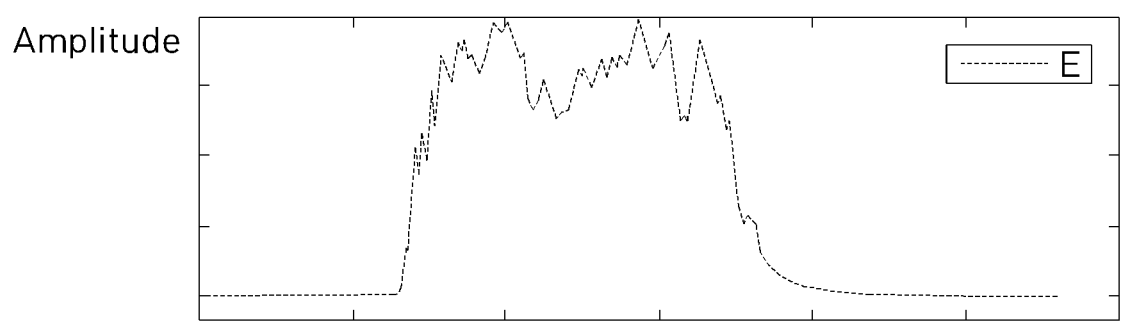
FIGS. 22A and 22B are diagrams showing angle information for obtaining a sum value of first measurement values and feature information for an object.
Figure 22B:
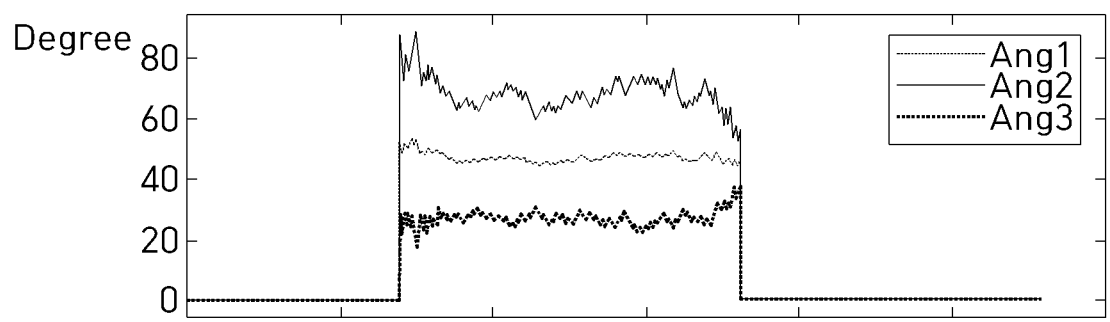

FIGS. 22A and 22B are diagrams showing angle information for obtaining a sum value of first measurement values and feature information for an object.

As an embodiment, the control part 240 may calculate ratio information between respective element values corresponding to the optical feature values, and obtain the feature information about an object based on the angle information obtained through the ratio information.

In order to know the substance characteristics of an object by a combination of scattered light and transmitted light, a conditional expression (Equation 14) derived as substance characteristics by combining optical feature values may be obtained. For example, in an embodiment of the present disclosure, angle information formed by a ratio between eigenvectors may be calculated and obtained as feature information for an object.

$$Ang1 = \tan^{-1}\left(\frac{v_4}{v_1}\right) \quad \text{[Equation 14]}$$

$$Ang2 = \tan^{-1}\left(\frac{v_4}{v_3}\right)$$

$$Ang3 = \tan^{-1}\left(\frac{v_2}{v_1}\right)$$

$$\vdots$$

Meanwhile, in an embodiment of the present disclosure, the conditional expression for classifying the substance characteristics of an object using optical feature values is not limited to the above-described Equation 14, and may be derived from values of various combinations of optical feature values according to Equation 13.

Hereinafter, a method performed by the optical feature information extraction system 100 or 200 according to an embodiment of the present disclosure will be described with reference to FIG. 23.

Figure 23:
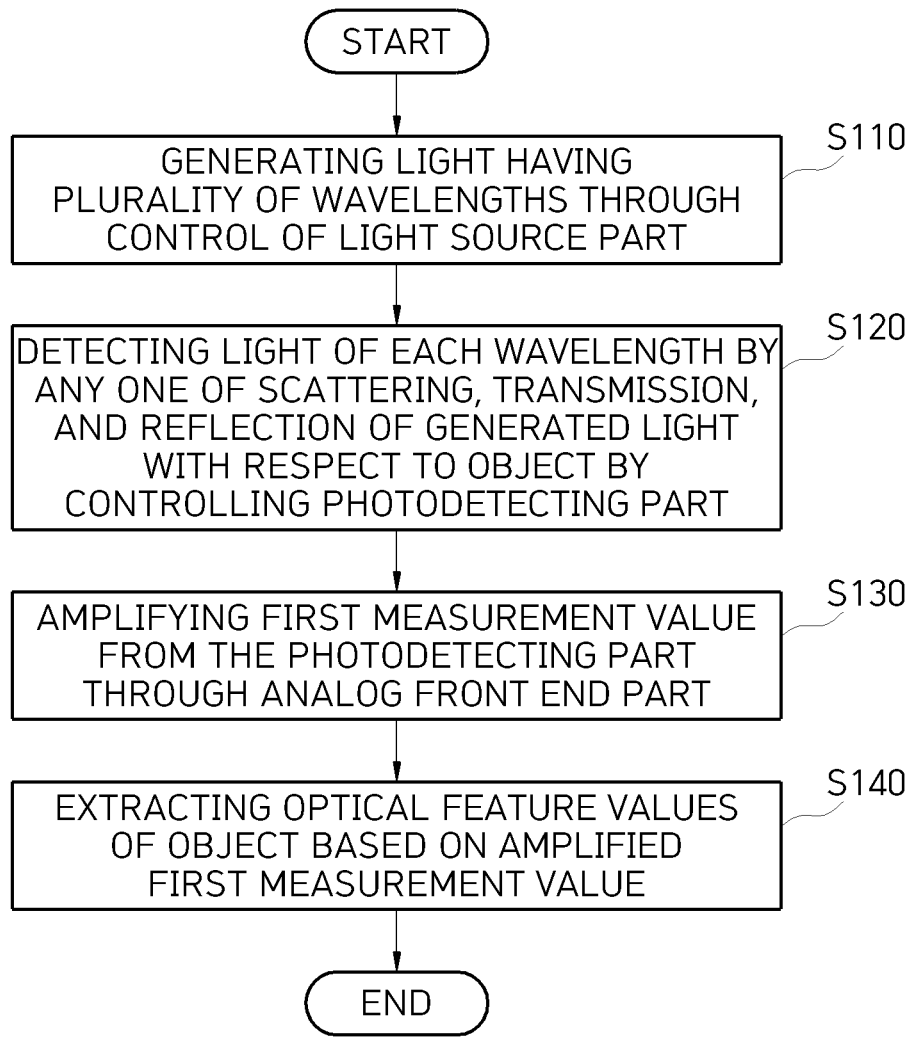
FIG. 23 is a flowchart of an optical feature information method according to an embodiment of the present disclosure.

FIG. 23 is a flowchart of an optical feature information method according to an embodiment of the present disclosure.

According to an embodiment of the present disclosure, first, the light having the plurality of wavelengths is generated through control of the light source part (S110), and the light of respective wavelengths by any one of scattering, transmission, and reflection of the generated light with respect to an object is detected through the control of the photodetecting part (S120).

Next, the first measurement value in the photodetecting part is amplified through the analog front end part (S130), and the optical feature values of the object based on the amplified first measurement value are extracted (S140).

Meanwhile, steps S110 to S140 in the above description may be further divided into additional steps or combined into fewer steps according to an embodiment of the present disclosure. Also, some steps may be omitted as needed, and the order of steps may be changed. Meanwhile, the contents of FIG. 1 and the contents of FIG. 22 may also be applied to the optical feature information extraction method of FIG. 23.

The optical feature information extraction method according to an embodiment of the present disclosure described above may be implemented as a program (or application) to be executed in combination with a computer, which is hardware, and may be stored in a medium.

The above-mentioned program may include a code coded in a computer language, such as C, C++, JAVA, Ruby, or machine language, that can be read by a processor (CPU) of the computer through a device interface of the computer in order for the computer to read the program and execute the methods implemented in the program. This code may include functional codes related to functions or the like defining necessary capabilities for executing the methods, and may include execution procedure-related control codes necessary for the computer's processor to execute the capabilities according to a predetermined procedure. In addition, this code may further include a code related to memory reference as to which location (address) of the computer's internal or external memory the additional information or medium necessary for the processor of the computer to execute the capabilities should be referenced from. Further, if the processor of the computer needs to communicate with any other remote computer or server in order to execute the capabilities, the code may further include a communication-related code as to how to communicate with any other remote computer or server using the communication module of the computer, what kind of information or medium should be sent and received during the communication, and the like.

The aforementioned storage medium is not a medium that stores data for a short moment, such as a register, cache, or memory, but a medium that stores data semi-permanently and is readable by a device. Specifically, examples of the aforementioned storage medium include, but are not limited to, ROM, RAM, CD-ROM, magnetic tape, floppy disk, optical data storage device, and the like. That is, the aforementioned program may be stored in various recording media on various servers accessible by the aforementioned computer, or in various recording media on the user's computer. Furthermore, the aforementioned medium may be distributed to computer systems connected by a network, and computer readable codes may be stored in a distributed manner.

The aforementioned description of the present disclosure is just an example, and a person having ordinary skill in the art to which the present disclosure pertains may understand that it can be easily modified into other specific configuration without changing the technical idea or essential features of the present disclosure. Accordingly, it should be understood that the embodiments described above are illustrative and not restrictive in every respect. For example, the respective components described as a singular form may be implemented in a distributed form, and the respective components described in a distributed form may be implemented in a combined form.

The scope of the disclosure is defined by the following claims rather than the detailed description, and all changed or modified forms derived from the meaning and scope of the claims and equivalents thereto should be interpreted as being included in the scope of the disclosure.

What is claimed is:

1. An optical feature information extraction system comprising:
    a light source part which generates light having a plurality of wavelengths;
    a photodetecting part which detects light of each wavelength by any one of scattering, transmission, and reflection of the generated light with respect to an object;
    an analog front end part amplifying a first measurement value from the photodetecting part; and
    a control part which extracts an optical feature value for the object based on the amplified first measurement value,
    wherein the control part obtains an amplified second measurement value of the photodetecting part for each wavelength in a state in which no object is present, and normalizes each first measurement value for each wavelength based on the second measurement value.

2. The optical feature information extraction system of claim 1, wherein:
    the light source part includes a plurality of light sources, each of which generates light corresponding to each of the plurality of wavelengths, and
    the photodetecting part has a wavelength bandwidth with which the photodetecting part is capable of detecting all of the plurality of wavelengths.

3. The optical feature information extraction system of claim 1, wherein the control part obtains a concentration-based optical feature information for the object through the sum value of the normalized first measurement values for each wavelength.

4. The optical feature information extraction system of claim 1, wherein:
    the control part generates matrix information in which a difference value between the normalized first measurement values is a value of each matrix element;
    the control part calculates an eigenvalue and an eigenvector for the matrix information based on each matrix element value constituting the matrix information; and
    the control part obtains each element value of the eigenvector as the optical feature value.

5. The optical feature information extraction system of claim 4, wherein the control part calculates ratio information between respective element values corresponding to the optical feature values, and obtains feature information for the object based on angle information obtained through the ratio information.

6. An optical feature information extraction system comprising:
    a light source part which generates light having a plurality of wavelengths;
    a multiple-channel-based photodetecting part which detects light of each wavelength by two or more of scattering, transmission, and reflection of the generated light with respect to an object;
    an analog front end part amplifying a plurality of first measurement values corresponding to respective multiple channels in the photodetecting part; and
    a control part which extracts an optical feature value for the object based on the amplified plurality of first measurement values,
    wherein the control part obtains a plurality of amplified second measurement values corresponding to respective channels of the photodetecting part for each wavelength in a state in which no object is present, and normalizes the first measurement values for each channel for said each wavelength based on the plurality of second measurement values.

7. The optical feature information extraction system of claim 6, wherein the control part obtains a concentration-based optical feature information for the object through the sum value of the normalized first measurement values for each channel for each wavelength.

8. The optical feature information extraction system of claim 6, wherein:
    the control part generates matrix information in which a vector sum for difference value in correlation magnitudes between the normalized first measurement values for each channel is a value of each matrix element;
    the control part calculates an eigenvalue and an eigenvector for the matrix information based on each matrix element value constituting the matrix information; and
    the control part obtains each element value of the eigenvector as the optical feature value.

9. The optical feature information extraction system of claim 8, wherein the control part calculates ratio information between respective element values corresponding to the optical feature values, and obtains feature information for the object based on angle information obtained through the ratio information.

10. A method performed by an optical feature information extraction system, the method comprising:
    generating light having a plurality of wavelengths through control of a light source part;
    detecting light of each wavelength by any one of scattering, transmission, and reflection of the generated light with respect to an object by controlling a photodetecting part;
    amplifying a first measurement value from the photodetecting part through an analog front end part; and
    extracting an optical feature value for the object based on the amplified first measurement value,
    wherein the extracting the optical feature value for the object based on the amplified first measurement value includes:
    obtaining an amplified second measurement value of a photodetecting part for each wavelength in a state in which no object is present; and
    normalizing each first measurement value for said each wavelength based on the second measurement value.

11. The method of claim 10, wherein:
the generating the light having the plurality of wavelengths through control of the light source part includes generating light corresponding to the plurality of wavelengths, respectively through the light source part including a plurality of light sources, and
the detecting the light of each wavelength includes detecting the light through a photodetecting part having a wavelength bandwidth with which the photodetecting part is capable of detecting all of the plurality of wavelengths.

12. The method of claim 10, wherein the extracting the optical feature value for the object based on the amplified first measurement value includes obtaining a concentration-based optical feature information for the object through the sum value of the normalized first measurement values for each wavelength.

13. The method of claim 10, wherein the extracting the optical feature value for the object based on the amplified first measurement value includes:

generating matrix information in which a difference value between the normalized first measurement values is each matrix element value;

calculating an eigenvalue and an eigenvector for the matrix information based on each matrix element value constituting the matrix information; and obtaining each element value of the eigenvector as the optical feature value.

14. The method of claim 13, wherein the obtaining each element value of the eigenvector as the optical feature value includes:

calculating ratio information between respective element values corresponding to the optical feature values; and obtaining feature information for the object based on angle information obtained through the ratio information.

* * * * *